Jan. 30, 1940. J. H. KING ET AL 2,188,552
FASTENING DEVICE
Filed Aug. 7, 1936

INVENTORS.
John H. King and
BY Royal R. Wotring.
Hood & Hahn.
ATTORNEYS.

Patented Jan. 30, 1940

2,188,552

UNITED STATES PATENT OFFICE 2,188,552

FASTENING DEVICE

John H. King and Royal R. Wotring, Indianapolis, Ind.

Application August 7, 1936, Serial No. 94,732

1 Claim. (Cl. 5—1)

The invention relates to improvements in fastener devices and primarily to fastener devices adapted for use in connection with a bumper mat of the character more fully disclosed in our co-pending application filed December 9, 1935, Serial No. 53,602 which has eventuated in Patent No. 2,129,941, Sept. 13, 1938. As disclosed in this application, the bumper mat comprises an outer envelope preferably formed of two pancake-like sections each provided with an annular rim at their meeting faces and adapted to be secured together by suitable means passing through openings in the rib or flange.

One of the objects of our present invention is to provide a fastening member for securing the two sections together, which may be readily secured in position and which will not cut or break under the impact of edged articles on the bumper mat such for instance as the edges of beer containers and the like.

For the purpose of disclosing the invention an embodiment thereof is shown in the accompanying drawing in which Fig. 1 is a perspective view of a bumper mat of the type for which the fastening device is primarily adapted to be used;

Figure 1:
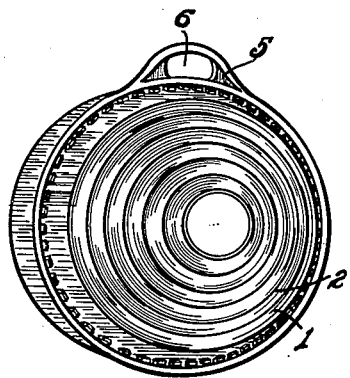
Figure 2:
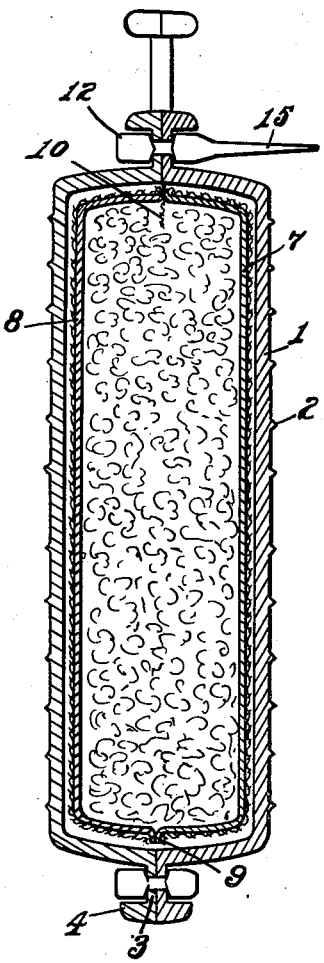
Fig. 2 is a longitudinal section thereof.
Figure 3:
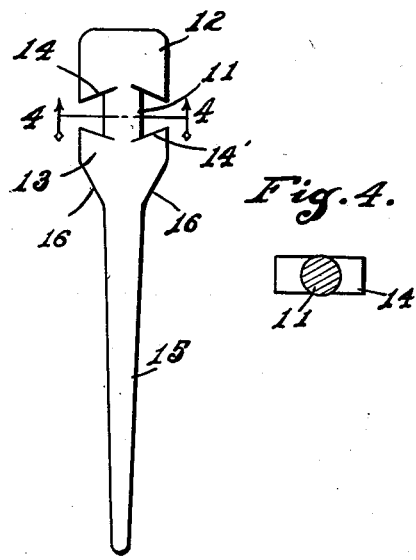
Fig. 3 is a side elevation of the fastening device.
Figure 4:
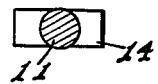
Fig. 4 is a section taken on the line 4—4 of Fig. 3.

In the structure illustrated, the bumper mat preferably consists of a pair of round pancake-shaped outer sections 1 each of which is identical and each of which is provided on its outer face with a series of circular ribs 2. At its outer edge each section, on its meeting face, is provided with an annular flange 3 widened at its top as at 4 to form an annular groove. At another point in its periphery the flange is enlarged as at 5 and provided with an opening 6 to form a handle. The two sections when joined together form a hollow outer casing which is formed of toughly cured pure rubber without any reinforcing material or reinforcing fabric embodied therein. It will be understood that where the term "pure rubber" is used as applied in this connection, the term means a structure in which the entire body is formed of rubber without any reinforcing filler of fabric, wires or other material.

For filling the hollow receptacle a container bag is provided which is formed of two sections 7 and 8 seamed at their outer peripheries as at 9 through the medium of an annular flange formed on each section and stitches passing through the flange. This bag, like the outer casing is formed of "pure rubber" and when the two sections of the bag are originally formed they are not entirely cured until after the bag has been filled and the sections stitched together. As a result a practically water-tight joint is made at the point 9. At one point in the periphery where the seam is made we provide a breather opening by inserting between the two sections a small strip of fabric such as 10 which passes through the seam and at this point prevents complete vulcanization or joining of the two sections of the bag. This provides a breather opening so that any air trapped in the bag may escape.

The outer surface of the bag or filler container is covered with a thin fabric such for instance as cambric or the like. This covering prevents the filler members from sticking to the container, particularly during the insertion of the filler member into the container but does not prevent the stretching of the filler member after assembly, under the impact of blows or dropping heavy articles on the mat. This fabric under such impacts readily breaks apart or splits and while providing the rubbing surface to prevent the filler bag from sticking to the casing does not prevent stretching of the filler bag.

The filler bag is filled with a suitable filler such as a mixture of rubber scraps, small particles of rubber mixed with granulated cork and sawdust or like material.

For connecting, after the filler bag has been inserted in position, the two sections of the outer casing 1 we provide a series of fasteners. Each of these fasteners is formed to take somewhat the shape of a dumb-bell having a center bar 11 and the two heads 12 and 13. The center bar 11 is preferably made round while the two heads 12 and 13 are made flat and the inner edges of the heads are preferably an inverted V shape as at 14. One of the heads, 13, is provided with an elongated tapering tail 15 for a purpose to be more fully hereinafter disclosed. The flanges 3 of the container are provided with coinciding openings throughout their periphery. These openings are slightly smaller in diameter than the diameter of the bar 11.

In assembly the pegs or fastening devices are inserted through the coinciding openings, the tail 15 acting as a guide means or threader and passing through the openings and providing a handle by which the same may be grasped for pulling the peg through. The peg is pulled through, and due to the inclined shoulders 16 the head 13 will completely pass through the opening until the bar is centered in the opening with the head 13 embracing the outer surface of the flanges. The peg, like the casing, is formed of pure rubber and as a result there is sufficient flexibility in the peg to permit it to stretch during the pulling of the same through the opening and the flange itself being formed of pure rubber will permit the opening to stretch to accommodate the head 13. However, as soon as the pull is released on the peg it will resume its normal position with the shoulders 14, 14' abutting against the side faces of the flange and with the bar slightly expanding in the openings. Due to the inclined faces 14, 14', which at their narrowest point are slightly less than the width of the two flanges, a clamping action is provided to securely hold the two flanges together. After the pegs or fasteners have been inserted in position the tail 15 is cut off to thereby leave a short dumb-bell fastening device extremely tough, resiliently holding the two parts together and practically as indestructible as the outer casing itself.

We claim:

A fastener for the edges of a bumper mat having a pair of pancake-like cover members formed of rubber and each having an annular flange, the flanges being adapted to lie adjacent to one another and having coinciding openings, comprising a bar adapted to extend through said openings and having at each of its opposite ends a head greater in diameter than the bar, and one of the heads being provided with a tapered tail considerably longer than the bar and adapted to be cut off after the fastener has been secured in position.

JOHN H. KING.
ROYAL R. WOTRING.